(12) United States Patent
Zeine

(10) Patent No.: US 12,168,235 B2
(45) Date of Patent: Dec. 17, 2024

(54) MAGNETIC SYSTEMS AND METHODS FOR OXYGEN SEPARATION AND PURIFICATION FROM FLUIDS

(71) Applicant: Zeine, Inc., Bellevue, WA (US)

(72) Inventor: Hatem Ibrahim Zeine, Woodinville, WA (US)

(73) Assignee: Zeine, Inc., Bellevue, WA (US)

( * ) Notice: Subject to any disclaimer, the term of this patent is extended or adjusted under 35 U.S.C. 154(b) by 300 days.

(21) Appl. No.: 17/242,500

(22) Filed: Apr. 28, 2021

(65) Prior Publication Data

US 2021/0339266 A1    Nov. 4, 2021

Related U.S. Application Data

(60) Provisional application No. 63/018,197, filed on Apr. 30, 2020.

(51) Int. Cl.
*B03C 1/033*    (2006.01)
*B01D 19/00*    (2006.01)
*B03C 1/28*    (2006.01)

(52) U.S. Cl.
CPC ........ *B03C 1/0332* (2013.01); *B01D 19/0089* (2013.01); *B03C 1/288* (2013.01); *B03C 2201/16* (2013.01); *B03C 2201/18* (2013.01); *B03C 2201/22* (2013.01)

(58) Field of Classification Search
CPC .............. B03C 1/0332; B03C 2201/16; B03C 2201/18; B03C 2201/32; B01D 19/0089
USPC .............................................. 95/28; 209/224
See application file for complete search history.

(56) References Cited

U.S. PATENT DOCUMENTS

| 1,056,043 | A | 3/1913 | Morrison |
| 1,146,020 | A | 7/1915 | Place |
| 1,426,461 | A | 8/1922 | Claude |
| 1,546,632 | A | 7/1925 | Dow et al. |

(Continued)

FOREIGN PATENT DOCUMENTS

| CN | 1183998 A | 6/1998 |
| CN | 2405153 Y | 11/2000 |

(Continued)

OTHER PUBLICATIONS

Woo; Ha Dong, "Oxygen Magnetic Separator in Air" (English Translation), Dec. 26, 2012, worldwide.espacenet.com (Year: 2012).*

(Continued)

*Primary Examiner* — Michael Mccullough
*Assistant Examiner* — Molly K Devine

(57) ABSTRACT

Magnetic systems and methods for oxygen separation and purification from fluids utilizing the paramagnetic properties of oxygen. A magnetic field gradient is established in a tube having a first end in flow communication with a source of a fluid containing oxygen. The fluid is flowed through the tube. The magnetic field gradient causes oxygen to be enriched in the fluid on a first interior side of the tube as compared to a second interior side of the tube. For a fluid like air having oxygen, a paramagnetic substance, and other, e.g., diamagnetic, components like nitrogen, argon, carbon dioxide and water vapor, the technology of the disclosure effectively separates oxygen molecules from the other components in magnetic field gradients of sufficient magnitude.

24 Claims, 11 Drawing Sheets

(56) References Cited

U.S. PATENT DOCUMENTS

| | | |
|---|---|---|
| 1,722,458 A | 7/1929 | Baufre |
| 1,976,336 A | 10/1934 | Eichelman |
| 2,149,764 A | 3/1939 | Frei |
| 3,186,929 A | 6/1965 | Rippie |
| 3,762,133 A | 10/1973 | Merriman et al. |
| 4,049,398 A | 9/1977 | Vaseen |
| 4,142,874 A | 3/1979 | Vaseen |
| 4,150,956 A | 4/1979 | Vaseen |
| 4,203,740 A | 5/1980 | Vaseen |
| 4,217,213 A | 8/1980 | Schuster |
| 4,261,711 A | 4/1981 | Vaseen |
| 4,343,707 A | 8/1982 | Lucas |
| 4,382,866 A | 5/1983 | Johnson |
| 4,704,139 A | 11/1987 | Yamamoto et al. |
| 4,769,130 A | 9/1988 | Christensen |
| 4,772,383 A | 9/1988 | Christensen |
| 4,816,143 A | 3/1989 | Vollmar |
| 5,366,623 A | 11/1994 | Clair |
| 5,443,719 A | 8/1995 | Johnson et al. |
| 5,622,622 A | 4/1997 | Johnson |
| 5,779,892 A | 7/1998 | Miltenyi et al. |
| 6,159,271 A | 12/2000 | Tillotson et al. |
| 6,361,749 B1 | 3/2002 | Terstappen et al. |
| 6,740,245 B2 | 5/2004 | Johnson |
| 7,740,759 B2 | 6/2010 | Su et al. |
| 7,771,509 B1 | 8/2010 | Brown |
| 8,460,634 B2 * | 6/2013 | Nichols ............... C01B 13/0207 423/658.2 |
| 10,357,780 B2 | 7/2019 | Kang et al. |
| 10,894,728 B2 | 1/2021 | Batkin, III |
| 2004/0020835 A1 | 2/2004 | Chang |
| 2007/0246430 A1 | 10/2007 | Chau |
| 2010/0147690 A1 * | 6/2010 | Audunson ............... B01F 23/29 204/662 |
| 2012/0080360 A1 | 4/2012 | Stone et al. |
| 2013/0233440 A1 | 9/2013 | Holder |
| 2014/0013950 A1 | 1/2014 | Inoue et al. |
| 2017/0241708 A1 | 8/2017 | Zeine |
| 2018/0178184 A1 | 1/2018 | Holland |
| 2019/0001343 A1 | 1/2019 | Grebenuk et al. |

FOREIGN PATENT DOCUMENTS

| | | | |
|---|---|---|---|
| CN | 1476921 A | 2/2004 | |
| CN | 101054164 A | 10/2007 | |
| CN | 201172625 Y | 12/2008 | |
| CN | 203771902 U | 8/2014 | |
| DE | 102006037805 A1 * | 3/2007 | ............ B03C 1/288 |
| JP | 59-80344 A | 5/1984 | |
| JP | 63-264155 A | 11/1988 | |
| JP | 5-220484 A | 8/1993 | |
| JP | 2011-501989 A | 1/2011 | |
| JP | 2013-59749 A | 4/2013 | |
| KR | 101215554 B1 * | 12/2012 | |

OTHER PUBLICATIONS

Schirber; Michael, "The Difference Between Round and Square Pipes", Oct. 5, 2015, physics.aps.org/articles/v8/94 (Year: 2015).*

Heller; Ulrich, "Device for Enrichment of Oxygen or Oxygen compounds in an Oxygen-Containing Gas Mixture" (English Translation ), Mar. 1, 2007, worldwide.espacenet.com (Year: 2007).*

Chinese Patent Application No. 201780024462.9, Office Action, 25 pages, Jun. 21, 2021.

European Patent Application No. 17757184.1, Extended European Search Report, 10 pages, Sep. 5, 2019.

Iacob, Gh. et al., "High Gradient Magnetic Separation Ordered Matrices," European Cells and Materials, vol. 3, Suppl. 2, pp. 167-169, 2002.

Japanese Patent Application No. 2018-545367, Office Action, 8 pages, Oct. 29, 2019.

Ueno, S. et al., "Redistribution Of Dissolved Oxygen Concentration Under Strong DC Magnetic Fields," IEEE Transactons on Magnetics, vol. 18, No. 6, pp. 1704-1706, Nov. 1982.

* cited by examiner

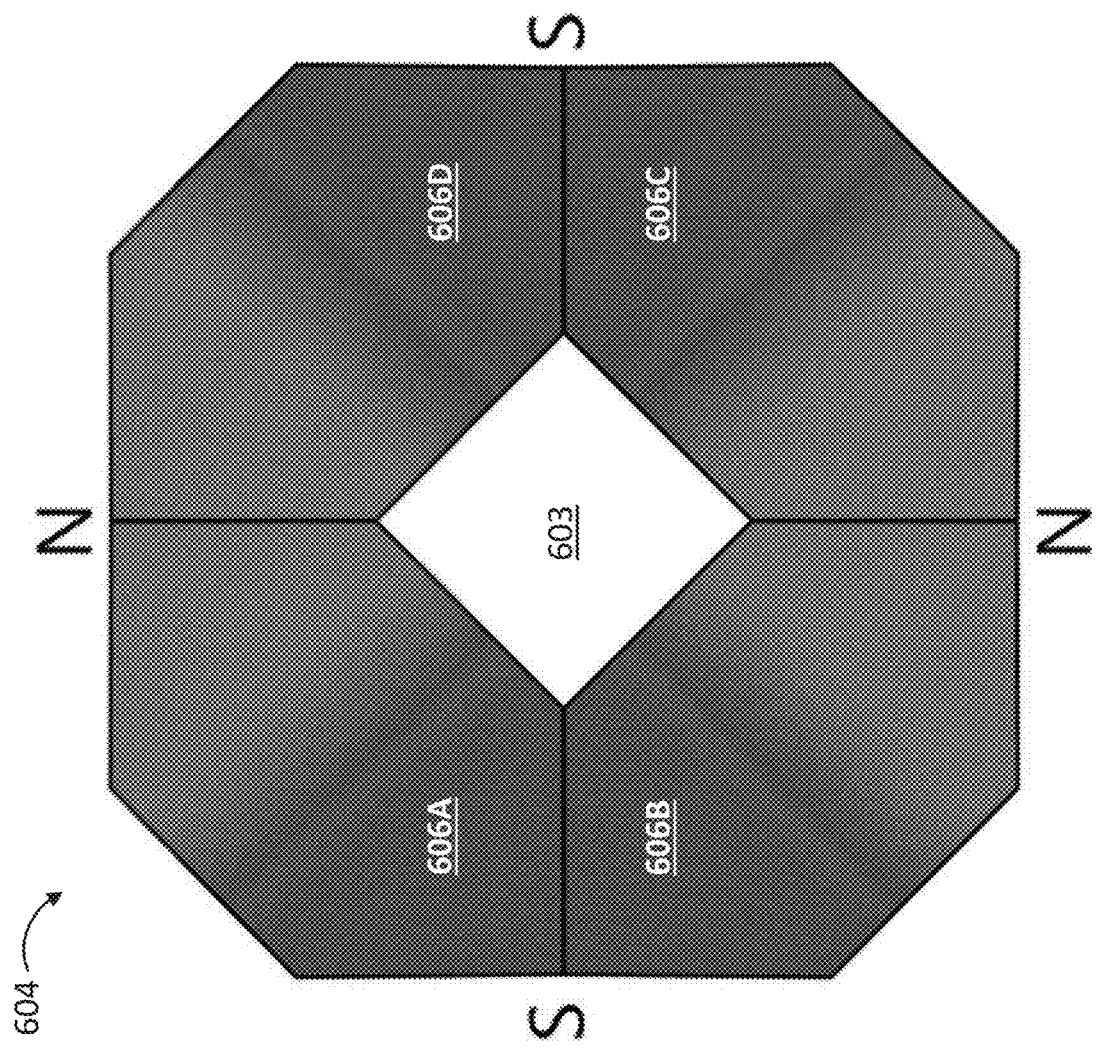
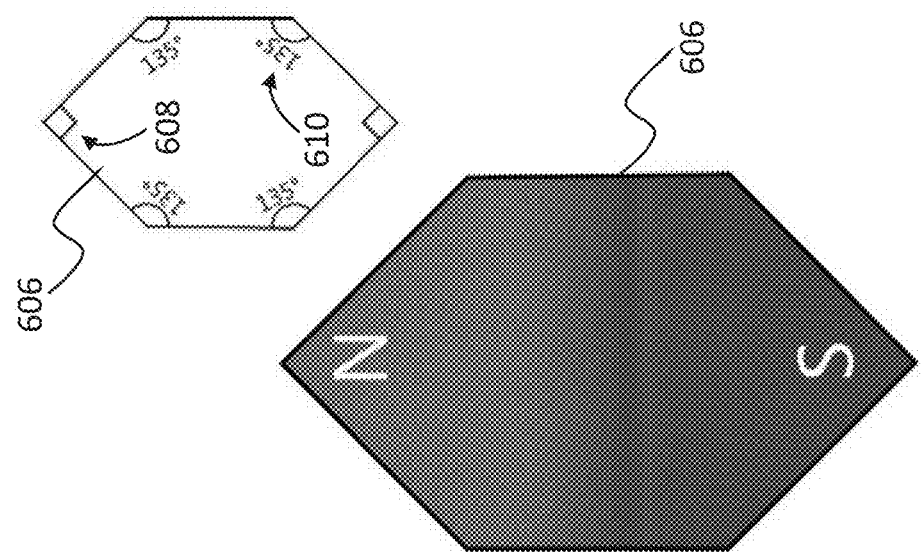
FIG. 7B
FIG. 7A

MAGNETIC SYSTEMS AND METHODS FOR OXYGEN SEPARATION AND PURIFICATION FROM FLUIDS

CROSS-REFERENCE TO RELATED APPLICATIONS

This application claims the benefit of, and priority to, U.S. Provisional Patent Application No. 63/018,197 filed on Apr. 30, 2020, which is incorporated by reference herein in its entirety.

TECHNICAL FIELD

Aspects of the disclosure relate to oxygen separation and purification, and more particularly to systems and methods for extracting oxygen from fluids utilizing the paramagnetic properties of oxygen.

BACKGROUND

Pure oxygen is useful in many ways. Fields that benefit from the use of pure oxygen include, for example, the medical field, sports and recreational fields, and the industrial field. Pure oxygen, however, is not readily available as a direct source but must instead be extracted from other sources including oxygen. There are various ways to capture or extract pure oxygen from such other sources. Extracting oxygen has typically been expensive and can require a complex setup that limits the supply of oxygen in various industries and fields.

In non-cryogenic extraction methods, processes such as adsorption, chemical processing, polymeric membranes, and ion transport membranes may be used. In the adsorption method, a material made up of special compounds is used that has unique capabilities for adsorbing certain gases such as oxygen, thus removing that gas from a mixture of other gases. The adsorption method does not entail a chemical change in the material, thus allowing for a reversible process. However, the complete removal of a specific gas using this process is difficult to achieve with great certainty. Since the process is reversible, an equilibrium state is achieved where the target gas starts flowing out of the adsorbing material.

By utilizing certain chemical approaches, it is possible to react with the gases and remove certain chemicals directly. This approach can be very effective to achieve 100% purity, since the chemical reaction will keep on happening given enough reactant and sufficient reactive area. Thus, the gas can be completely removed. However, chemical separation approaches can be quite complex to implement and do not currently present meaningful market share. Furthermore, creating continuous systems based on chemical approaches is difficult.

By filtering air through a permeable membrane such that the membrane has higher permeability to oxygen than another gas (such as nitrogen), the concentration of oxygen can be increased by trapping or filtering the other, larger gas molecules. This technique, however, does not typically achieve a high purity in the target gas because, as a separator, the filter will allow gases that are more permeable than the target gas to pass through unimpeded. Thus, the resultant gas includes a mixture of all of the gases more permeable than what the filter can remove.

The ion transport membrane method uses hot liquid gases (that would ionize oxygen) passing over special (ceramic) membranes that allow the oxygen ions to pass through and recombine to create pure oxygen. However, while this process can achieve pure oxygen, a disadvantage includes high energy costs for heating and for recompressing the recombined oxygen.

In one cryogenic extraction method, by utilizing pressure and centrifuges, it is possible to separate oxygen from air without liquefaction. However, this process suffers from high energy costs and complex equipment.

Another cryogenic extraction method takes advantage of the fact that at a certain pressure, every gas has a separate boiling temperature. By gradually reducing the pressure (e.g., relieving the pressure) from an outlet of a liquid air container, every gas will take its turn to exit the tank according to its boiling temperature. This approach is effective at separating all types of gases from each other, but suffers from energy losses at many stages and that the process cannot be done in a continuous mechanism, requiring staging of separate lines for compressing and separation.

Thus, it would be advantageous to utilize a system of extracting pure oxygen from air that overcomes the aforementioned drawbacks.

SUMMARY

In one aspect, the present disclosure provides a system for extracting oxygen from a fluid. The fluid may be a liquid, a gas, or combinations thereof. The system includes one or more tubes defining a fluid flow path, and one or more magnets positioned proximal the one or more tubes to establish a magnetic field gradient in the fluid flow path. The system also includes a flow divider positioned inside a portion of the one more tubes proximal a downstream end of the one or more tubes. A magnetic field gradient may be established inside the one or more tubes by the one or more magnets. The magnetic field gradient may have a magnitude that is greater on a first side of the fluid flow path as compared to a second side of the fluid flow path. The flow divider fluidically isolates the first side from the second side. At least one of the one or more tubes may have a circular cross-section. The magnetic field gradient may be established radially across the fluid flow path. The system may include a means for reflowing at least a portion of the fluid downstream of the flow divider through the one or more tubes. The system may include a means for determining an oxygen content of the fluid in at least one of: the first side, and the second side. In an example, the means for determining the oxygen content is positioned downstream of the flow divider. The means for determining the oxygen content may be further positioned in or on the means for reflowing the fluid and at least partially in contact with the at least one of: the first side, and the second side.

In another aspect, the present disclosure provides a system for extracting oxygen from a fluid. The fluid may be a liquid, a gas, or combinations thereof. The system includes a separator stage. The separator stage may include a separator tube having an interior portion defining a fluid flow path from a first end of the separator tube to a second end of the separator tube. The separator stage may include at least one magnet positioned proximal the separator tube between the first and second ends to establish a magnetic field gradient in the interior portion. A magnitude of the magnetic field gradient may be greater on a first lateral side of the interior portion as compared to a second lateral side of the interior portion. The system also includes a flow director stage. The flow director stage may include a flow divider positioned inside a portion of the separator tube proximal the second end to divide the fluid flow path into a first flow path and a second flow path. The flow director stage may include a first exit tube in flow communication with the second end for carrying the first flow path downstream of the separator tube. The flow director stage may include a second exit tube in flow communication with the second end for carrying the second flow path downstream of the separator tube. In the presence of a fluid flow of a fluid having oxygen, the first flow path may include an oxygen enriched fluid flow. The separator tube may have a circular cross-section. The magnetic field gradient may be established radially across the interior portion of the separator tube. The system may include a means for reflowing the fluid in the second flow path downstream of the separator tube through the separator tube. The system may include a means for determining an oxygen content of the fluid in the second flow path downstream of the separator tube. In an example, the means for determining the oxygen content is positioned in or on the means for reflowing the fluid and at least partially in contact with the fluid in the second flow path downstream of the separator tube.

A further aspect of the present disclosure provides an oxygen separation method. The method includes establishing a magnetic field gradient in a tube having a first end in flow communication with a source of a fluid containing oxygen. The fluid may be a liquid, a gas, or combinations thereof. The method includes flowing the fluid through the tube. The magnetic field gradient causes oxygen to be enriched in the fluid on a first interior side of the tube as compared to a second interior side of the tube. The method may include directing, at a second end of the tube, at least a portion of the fluid flowing in the first lateral side to a means for collecting an oxygen enriched fluid. The tube may have a circular cross section. Establishing the magnetic field gradient may include establishing the magnetic field gradient radially across an interior portion of the tube. The method may include determining an oxygen content of the oxygen enriched fluid. The method may include reflowing the oxygen enriched fluid through the tube for a number of times sufficient to attain a predetermined oxygen content in the oxygen enriched fluid.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 7A and 7B illustrate cross-sectional views of a magnet as shown in FIG. 6, according to an embodiment.

The details of one or more examples of the disclosure are set forth in the accompanying drawings and the description below. Other features, objects, and advantages of the disclosure will be apparent from the description and drawings, and from the claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
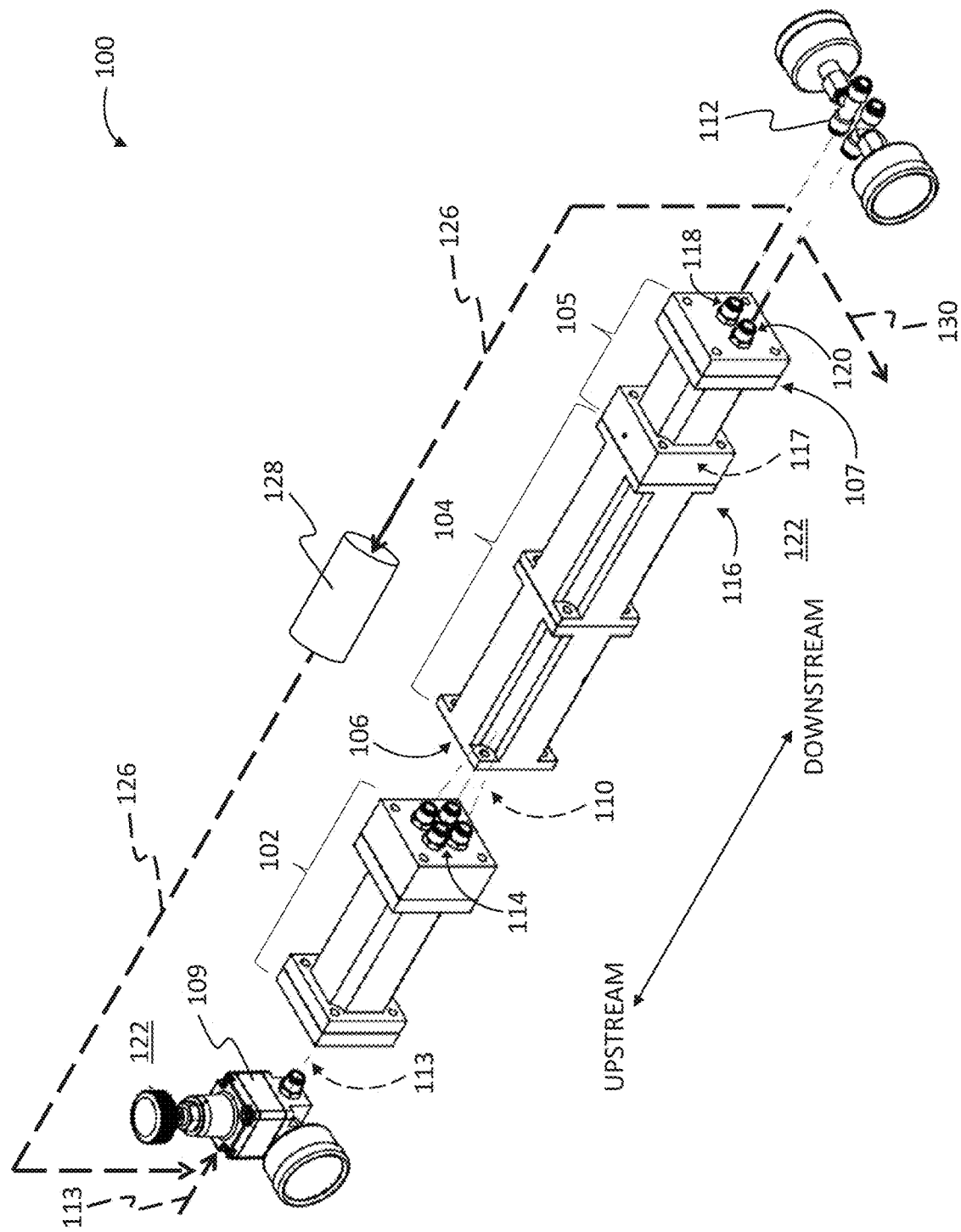
FIG. 1 illustrates an oxygen extraction system according to an embodiment.

FIG. 1 illustrates an oxygen extraction system 100 according to one embodiment. System 100 includes an intake stage 102, a separation stage 104, and a flow division stage 105. Intake stage 102 includes an intake port at a first end for receiving a flow 113 of a fluid in the form of a gas and/or a liquid. Intake stage 102 includes a flow splitter for splitting the flow 113 received at the intake port as a single stream into a plurality of flow streams 110. In the embodiment shown in FIG. 1, at a point downstream of the intake port, a single intake tube in flow communication with the intake port is split into four flow streams 110 exiting through four outlet ports 114 at a second end of intake stage 102. In some embodiments, an input regulator 109 is coupled to the intake port of intake stage 102 for adjusting a flow rate or pressure of the flow 113 of fluid into the intake port of intake stage 102, and thus also the corresponding flow streams 110 of the fluid out of the outlet ports 114.

In an example, the fluid flowing into intake stage 102 is a gas, while in other embodiments, the fluid is a liquid. In another example, the fluid flowing into intake stage 102 is a mixture of a liquid and a gas. The fluid may be provided from ambient air surrounding system 100 by way of compressor(s) or pump(s), for instance. In an example, the fluid may be flowed into the intake stage 102 from a fluid source other than the ambient external environment 122 of system 100. In some embodiments, not shown in FIG. 1, the fluid is subject to one or more preprocessing or conditioning processes. For example, and without limitation, the fluid may be compressed, expanded, liquified, vaporized, degassed, cooled, heated, dehumidified, desiccated, humidified, or the like, prior to being caused to flow into the intake port of intake stage 102. Such unit processes may be accomplished, at least in part, using devices or subsystems (not shown in FIG. 1) housed in, or otherwise positioned on, in, and/or proximal to the intake stage 102 or input regulator 109.

The plurality of flow streams 110 exiting intake stage 102 through outlet ports 114 continue downstream to separation stage 104. Separation stage 104 includes a first end 106 and a second end 116. As further shown and described below with reference to FIGS. 2A, 2B and 3, separation stage 104 includes devices arranged and configured to receive each of the plurality flow streams 110 from intake stream 102 and effect an enrichment of oxygen content in each of the separate flow streams 110 according to the technology of the present disclosure. In the embodiment illustrated in FIG. 1, intake stage 102 is shown disassembled apart from separation stage 104 for clarity of description. In the assembled system 100, however, first end 106 of separation stage 104 is coupled to the intake stage 102 with the four outlet ports 114 providing conduits for continued flow of the four separate flow streams 110 from the intake stage 102 into and through the separation stage 104.

A first, upstream end of flow divider stage 105 is coupled to the second end 116 of the separation stage 104. Flow division stage 105 includes a flow divider 117 positioned proximal the first end for fluidically isolating a first portion of each of the plurality of flow streams 110 from a second portion of each of the plurality of flow streams 110. As a result of passing through a length of separation stage 104, the first portions of flow streams 110 are enriched in oxygen (e.g., $O_2$), while second portions of flow streams 110 are depleted of oxygen. Flow divider 117 thereby divides (e.g., splits) each of the plurality of flow streams 110 exiting separation stage 104 at the second, downstream end 116 into two flow paths continuing downstream through flow division stage 105 toward a second end 107 thereof.

Inside flow division stage 105, downstream of flow divider 117, each split flow path recombines to provide two separate flows exiting system 100 at the second end 107 of flow division stage 105: an oxygen enriched fluid flow 136 exiting a first outlet port 118, and an oxygen depleted fluid flow exiting a second outlet port 120. In some embodiments, an output regulator 112 is coupled to the first 118 and second 120 outlet ports of flow division state 105 for adjusting a flow rate or pressure of oxygen enriched 126 and oxygen depleted 130 fluid flows, respectively. In some embodiments, an inlet means for drawing fluid 113 into an upstream-most end of system 100 is preferably positioned a sufficient distance from outlet port 118 so as to avoid the less-oxygenated fluid flow 130 from being drawn back into system 100.

In an example, the fluid flowing out of either output port (118, 120) is a gas, while in other embodiments, either of those fluids is a liquid. In another example, the fluid flowing out of either of output ports 118 and 120 is a mixture of a liquid and a gas. In some embodiments, the oxygen depleted fluid flow 130 is exhausted to external environment 122. System 100 may include a means for collecting the oxygen enriched fluid flow 130 (e.g., a tank, further piping or tubing, a point of sale, a point of use, or the like) after it exits output port 118, which may include further tubing or piping connected in flow communication with output port 118.

In some embodiments, flow 130 may be delivered directly to a collection chamber or vessel located proximal system 100 or at some distance therefrom. In an example, the oxygen enriched fluid 130 may be compressed, expanded, liquified, vaporized, degassed, cooled, heated, dehumidified, desiccated, humidified, or the like, prior to, or after, being caused to flow out of output port 118 of flow division stage 105. Such unit processes may be accomplished, at least in part, using devices or subsystems (not shown in FIG. 1) housed in, or otherwise positioned on, in, and/or proximal to the flow division stage 105 or output regulator 112.

In some embodiments, a means for determining an oxygen content (e.g., % $O_2$, $pO_2$, and like measures), such as oxygen sensor 128 is situated in a flow path of oxygen enriched fluid 130. In one example, sensor 128 is positioned in, on, and/or proximal to the means for reflowing the fluid and at least partially in contact with the fluid in the second flow path (e.g., flow 126) downstream of the separator tube. In an example, one or more instances of the disclosed system 100 are utilized to further purify the oxygen enriched fluid 130 flowing out of system 100 in a first instance or iteration. For example, where flow 113 is ambient air containing nitrogen (78.09%), oxygen (20.95%), argon (0.93%), carbon dioxide (0.03%), and water vapor (% varies), a concentration of oxygen as, e.g., $O_2$, of the flow 126 may be enriched to 25%, as determined by oxygen sensor 128. In some embodiments, the flow 126 may be directed via tubing or piping back to an initial input port to system 100 at the upstream end of intake stage 102, with ambient air no longer being taken into system 100 from ambient air. For this purpose, system 100 may include a means for reflowing (e.g., a pipe or tube) at least a portion of the fluid downstream of the flow divider through the one or more tubes. In this case, the input flow 113 may be the oxygen enriched fluid 126 flow, and successive and iterative passes through system 100 may be utilized to further enrich the resulting flow exiting output port 118 until the oxygen content of the oxygen enriched fluid flow achieves a predetermined or otherwise desired percent $O_2$. At that time, and as determined by, for instance, sensor 128, the flow 126 from output port 118 may be diverted to the collecting means and any other processes by unit operations such as those described above.

In other embodiments, the system 100 may be used to deoxygenate the fluid 113 entering the system 100. In such cases, the oxygen enriched fluid 126 may be expelled to the ambient environment 122, and the oxygen depleted fluid 130 flow may be kept and its oxygen content determined by sensor 128, in a substantially similar, although conversely purposed, manner as described above.

Figure 2A:
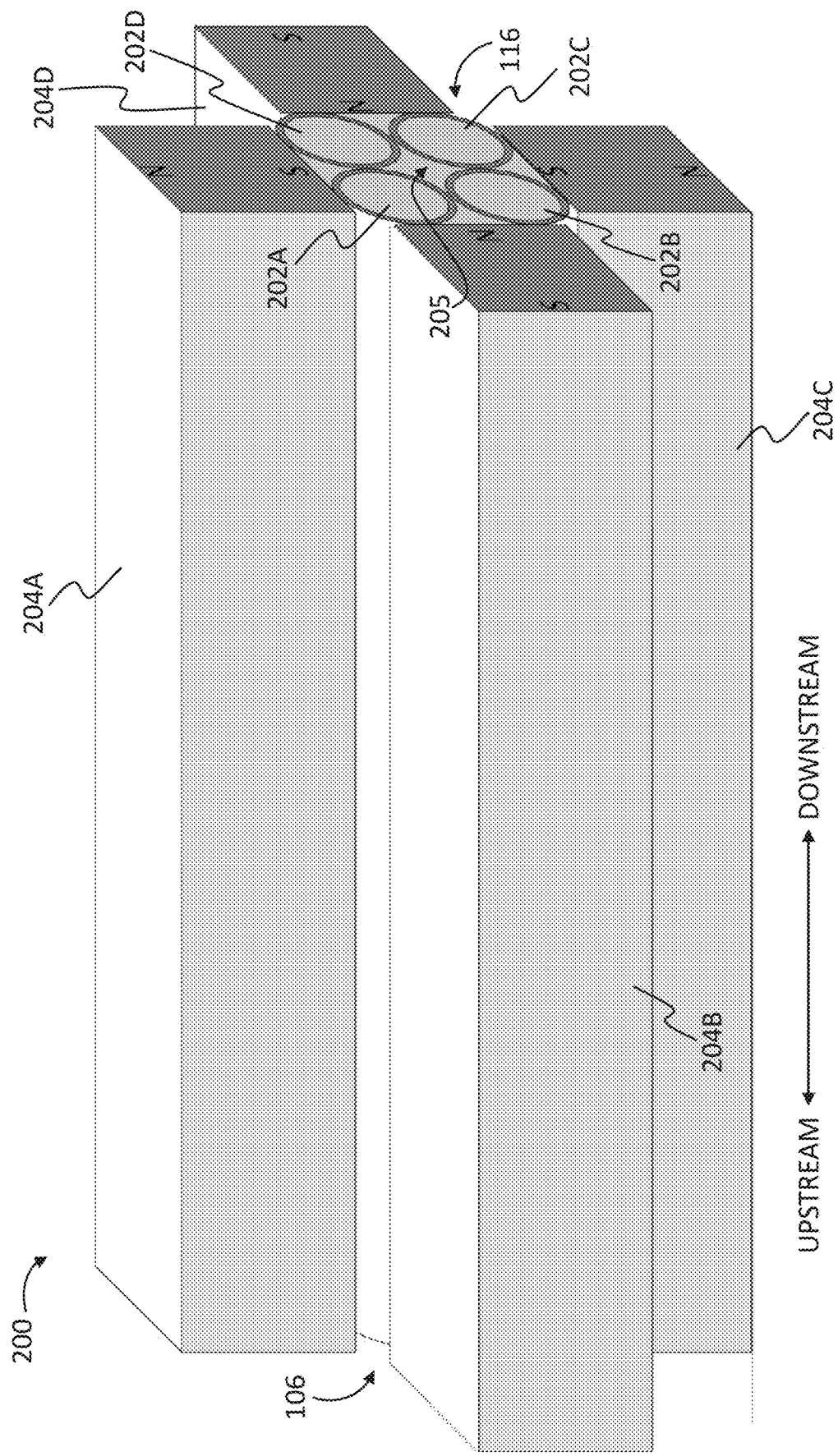
FIGS. 2A and 2B illustrate perspective and sectional views of an oxygen separation subsystem of the separator stage shown in FIG. 1, according to an embodiment.
Figure 2B:
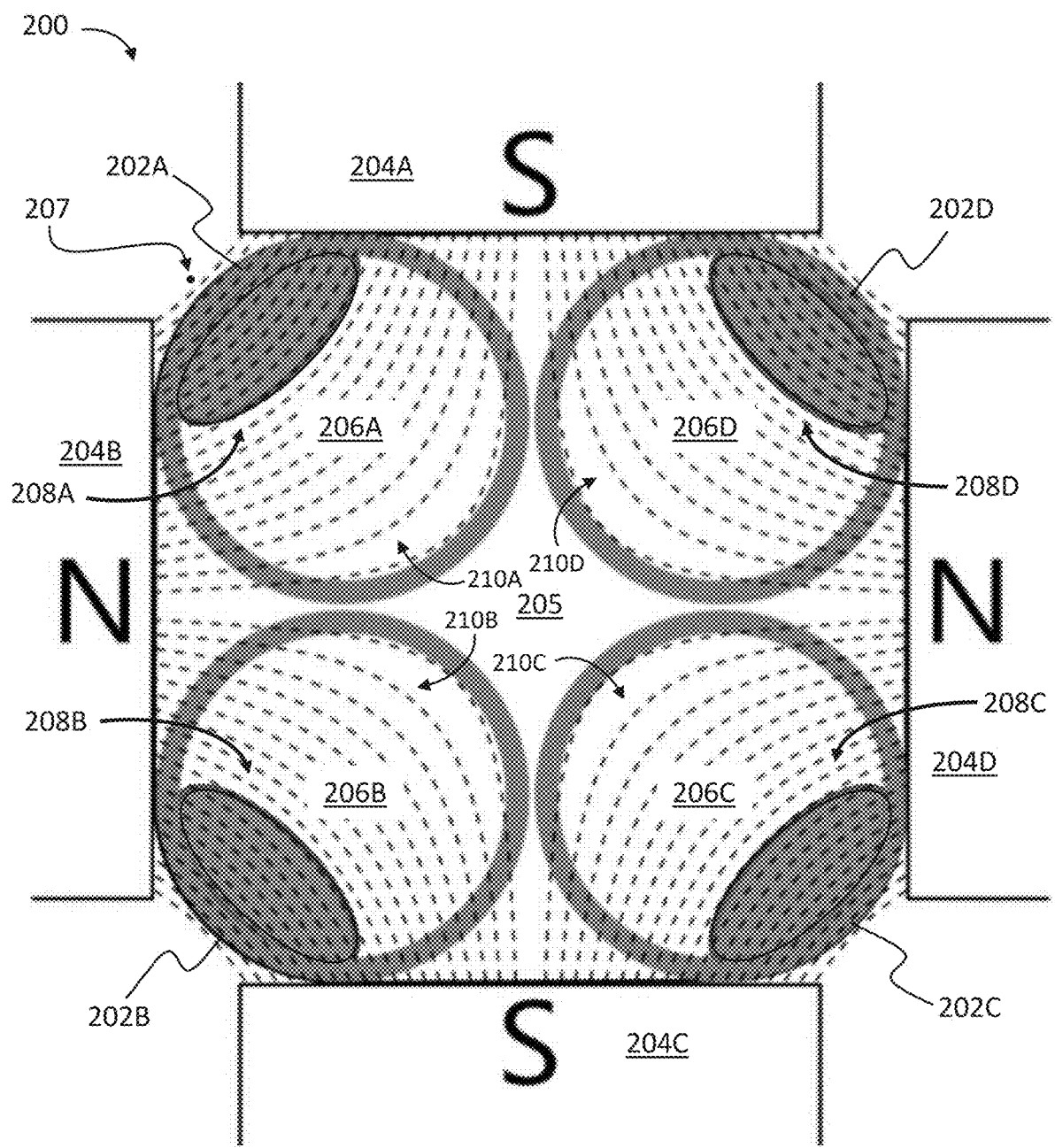

FIGS. 2A and 2B illustrate perspective and sectional views of an oxygen separation subsystem 200 of the separator stage 104 shown in FIG. 1, according to an embodiment. In the illustrated embodiment, separator stage 104 of FIG. 1 includes an exterior housing in which subsystem 200 is positioned. Subsystem 200 includes at least one magnet 204 positioned proximal at least one separator tube 202. In some embodiments, the housing is not present in separator stage 104. As shown in FIG. 2A, an upstream end of separator tube 202 is located proximal first end 106 of separator stage 104 and in flow communication with at least one of outlet ports 114 of intake stage 102. A downstream end of separator tube 202 is located proximal second end 116 of separator stage 104 and in flow communication with flow divider 117 of flow division stage 105. Separator tube 202 has an interior portion defining a fluid flow path from the upstream to downstream end of separator tube, and thus also from first 106 to second 116 end of separator stage 104. The at least one magnet 204 is positioned proximal the separator tube 202 between the upstream and downstream ends of separator tube 202, and thus also between the first 106 and second 116 ends of separator stage 104.

In some embodiments, as shown in FIGS. 2A and 2B for example, four separator tubes (202A, 202B, 202C and 202D) are arranged adjacent to one another so as to minimize a cross-sectional area of a central space 205 between the four tubes 202. Four permanent (e.g., neodymium or other rare Earth element-containing material) magnets (204A, 204B, 204C and 204D) are arranged symmetrically around the four separator tubes 202A-202D, as shown in FIGS. 2A and 2B. Two of the four magnets 204 are arranged with their south poles (denoted "S" in FIGS. 2A and 2B)

adjacent respective pairs of separator tubes 202. For instance, as shown in FIG. 2B, a first magnet 204A has its south pole positioned adjacent to the pair of first 202A and fourth 202D tubes, and a third magnet 204C has its south pole positioned adjacent to the pair of second 202B and third 202C tubes. The other two of the four magnets 204 are arranged with their north poles (denoted "N" in FIGS. 2A and 2B) adjacent respective pairs of separator tubes 202. For instance, as shown in FIG. 2B, a second magnet 204B has its north pole positioned adjacent to the pair of first 202A and second 202B tubes, and a fourth magnet 204D has its north pole positioned adjacent to the pair of third 202C and fourth 202D tubes. Thus, each of the magnets 204 are edge-wise magnetized.

In some embodiments, one magnet 204 contacts exterior surfaces of two adjacent separator tubes 202, as shown in FIGS. 2A and 2B. In some embodiments, the four magnets 204 are shaped as rectangular cubes having a square cross-sectional area, with each of the four magnets 204 having substantially equal (e.g., within +/−10%) cross-sectional area, and thus also lateral side length. In some embodiments, the side length of each magnet 204 is less than twice the outer diameter of one of the four separator tubes 202. In other embodiments, the side length of each magnet 204 is substantially equal (e.g., within +/−10%) to twice the outer diameter of one of the four separator tubes 202.

Materials of constructions, wall thicknesses, gauges, and lengths of the separator tubes 202 are selected according to system 100 design considerations such as the flow rate, pressure, temperature, physical state (e.g., liquid or gas) and composition of the fluid 113 being processed and the magnetic properties and lengths of magnets 204. In an example, separator tubes 202 are formed from materials of construction that do not, or only nominally, interfere with passage of the magnetic field through tube 202 walls and establishment of the magnetic field gradient in interior portions of tubes, as described herein. For this reason, separator tubes 202 may be formed, for instance, from non-ferrous or non-ferromagnetic materials of construction. In some embodiments, a length of each of the four separator tubes 202 are substantially equal (e.g., within +/−10%) and is greater than a longitudinal length of each magnet 204. In other embodiments, separator tube 202 length is substantially equal (e.g., within +/−10%) to the magnet's 204 longitudinal length.

Magnet(s) 204 establish a magnetic field gradient(s) (e.g., 206A, 206B, 206C and 206D, denoted by dashed lines in FIG. 2B) in the interior portion(s) of separator tube(s) 202, where a magnitude of the magnetic field gradient is greater on a first lateral side of the separator tube 202 interior portion as compared to a second lateral side of the interior portion. In the embodiment illustrated in FIG. 2B, for example, interior portions of each separator tube (202A, 202B, 202C and 202D) has a respective magnetic field gradient (206A, 206B, 206C and 206D) established therein by a respective pair of perpendicularly arranged magnets 204. In some embodiments, the magnet(s) 204 are arranged or otherwise positioned such that respective magnetic field gradient(s) are established in the interior portions at least partially perpendicular the fluid flow paths of separator tubes 202. For the first separator tube 202A, for instance, the magnitude of the magnetic field gradient is greater on the lateral side of the tube 202A interior portion that is closest to a point 207 where first 204A and second 204B magnets are positioned closest to one another. This is shown in FIG. 2B by closer spacing of dashed lines denoting magnetic field gradient 206A. The magnetic field gradient 206A decreases in magnitude as the distance from point 207 to space 205 increases through the interior portion of separator tube 202A, as by the dashed lines in FIG. 2B having progressively wider spacing along that distance. Interior portions of the remaining separator tubes 202B, 202C and 202D of FIG. 2B experience like phenomena as the first tube 202A on account of the above described arrangement of magnets 204.

For fluid 113 like air having oxygen, a paramagnetic substance, and other, e.g., diamagnetic, components like nitrogen, argon, carbon dioxide and water vapor, oxygen molecules are effectively separated from the other components in magnetic field gradients of sufficient magnitude. The separation of purification of oxygen from fluid 113 according to the systems and methods described herein is achieved by taking advantage of the paramagnetic property of oxygen, and the fact that diamagnetic components of fluid 113 are effectively repelled by magnetic fields. Thus, as fluid 113 flows through the separator tube(s) 202 of separator stage 104 having the above described magnetic field gradients 206A-206D established therein, flow regions 208A-208D are established where the flowing fluid 113 becomes oxygen enriched (denoted by the ovoid shaded regions in FIG. 2B). The flow 113 of fluid thereby becomes progressively more enriched in oxygen on first lateral sides of the separator tubes' 202 interior portions on account of the disclosed magnetic separation in downstream portions of separator tubes 202 as compared to the second lateral sides and upstream portions of separator tubes 202. Similarly, flow regions 208A-208D are depleted of the diamagnetic components of flow 113 which migrate toward and become more concentrated in the second lateral sides of separator tubes' 202 interior portions as flow 113 progresses downstream.

By establishing the magnetic field gradients (e.g., 206A-206D) and exposing flow 113 to them in separator tubes 202, the oxygen in fluid 113 separates from the other diamagnetic gases. In some embodiments, the oxygen separation rate is directly proportional to the magnitude of the magnetic field gradient(s) (e.g., 206A-206D) and inversely proportional to the fluid 113 flow rate through separator tubes 202. Other parameters such as pressure, temperature, physical state (e.g., liquid or gas) and composition of the fluid 113 flowing through separator stage 104 may also at least partially dictate the oxygen separation rate in operation of system 100.

The maximum magnitude of the magnetic field gradient (e.g., 206A) established by magnet(s) 204 in separator tube(s) 202 (e.g., closest to point 207 in FIG. 2B) is sufficient to effect the magnetic separation and purification of paramagnetic oxygen in the separator stage 104 to an extent whereby the oxygen content (e.g., %) of fluid 126 exiting a downstream end of system 100 is greater than the oxygen content of fluid 113 entering an upstream end of system 100. In one example, the magnetic field gradient (e.g., 206A, closest to point 207) has a maximum magnitude of greater than or equal to 0.1 tesla per meter (T/m). In another example, the magnetic field gradient (e.g., 206A, closest to point 207) has a maximum magnitude of greater than or equal to 0.5 T/m. In yet another example, the magnetic field gradient (e.g., 206A, closest to point 207) has a maximum magnitude of greater than or equal to 1 T/m. In still another embodiment, the magnetic field gradient (e.g., 206A, closest to point 207) has a maximum magnitude of greater than or equal to 5 T/m. In another example, the magnetic field gradient (e.g., 206A, closest to point 207) has a maximum magnitude of greater than 5 T/m and less than 10 T/m. In yet another example, the magnetic field gradient (e.g., 206A, closest to point 207) has a maximum magnitude of greater than or equal to 10 T/m. In still another example, the magnetic field gradient (e.g., 206A, closest to point 207) has a maximum magnitude that is limited only by the maximum magnetic field or magnetic field gradient capable of being produced by magnet(s) of the present state of the art being used as magnet(s) 204 for use in system 100.

In some embodiments, neodymium permanent magnet(s) 204 are employed in separator stage 204 to achieve this magnitude for the magnetic field gradient(s) (e.g., 206A-206D) along with, for instance, the magnet 204-tube 202 arrangement as shown in FIGS. 2A and 2B. The disclosed arrangement in separator stage 104 positions the opposing poles of adjacent pairs of magnets 204 close to each other to thereby provide small enough magnetic tips to force the resulting magnetic field to squeeze. This enables sufficiently large magnetic fields and field gradients to be established in the first interior portions of separator tubes 202 to cause the oxygen separation in the flowing fluid 113, as shown in FIG. 2B for example.

Figure 3:
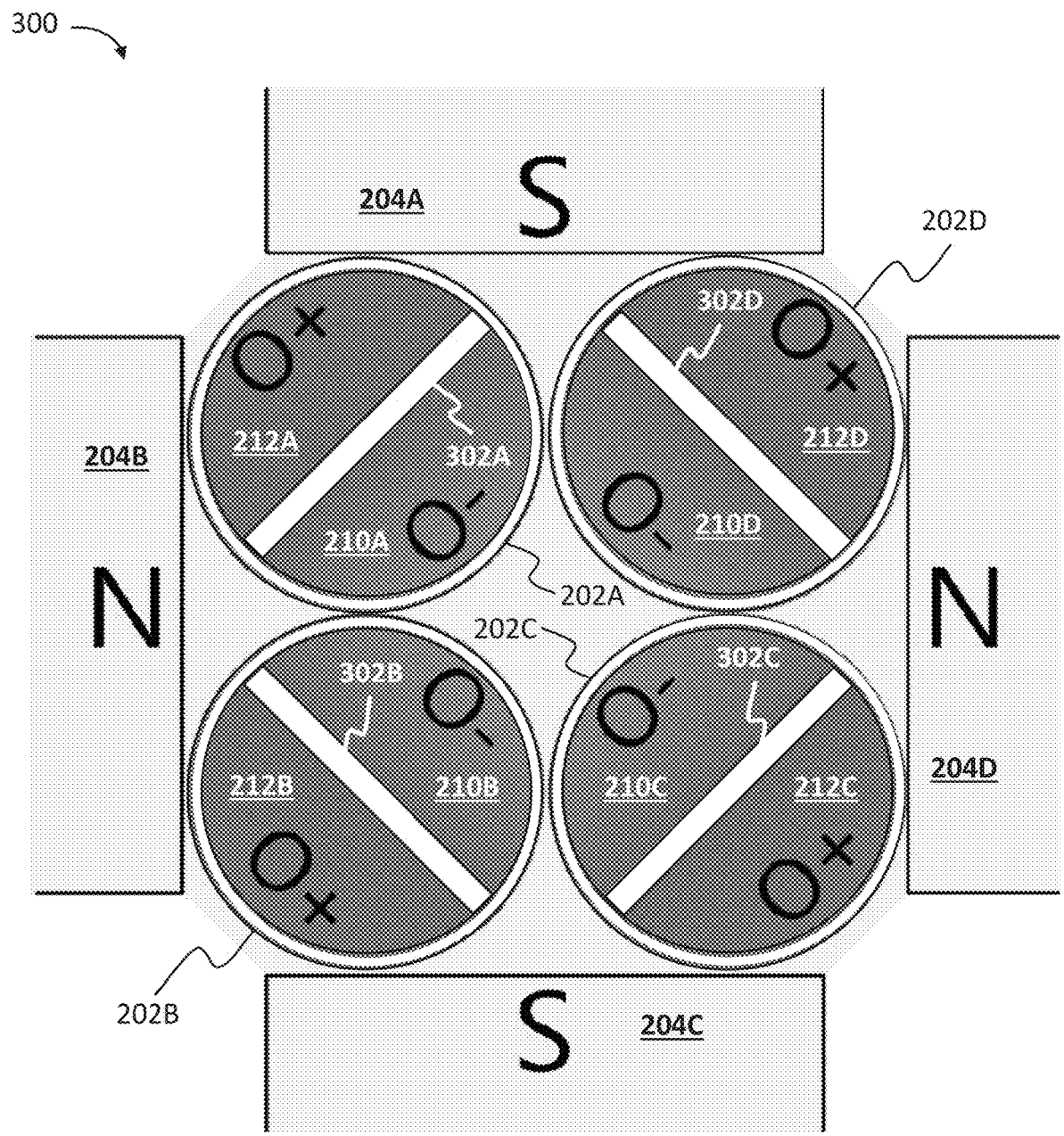
FIG. 3 illustrates a cross-sectional view of a downstream portion of the separator stage shown in FIGS. 1, 2A and 2B, according to an embodiment.

FIG. 3 illustrates a cross-sectional view of a downstream portion 300 of the separator stage 104 shown in FIGS. 1, 2A and 2B, according to an embodiment. The arrangement of magnets 204 with respect to separator tubes 202 illustrated in FIG. 3 is equivalent to that described above with respect to FIGS. 2A and 2B. In downstream portion 300 of separator stage 104, a divider device 302 is positioned in the interior cavity of each separator tube 202 to divide the flow of fluid 113 therein into a dually partitioned flow. In some embodiments, a first portion of flow 113 in separator tube 202 includes an oxygen depleted flow portion (denoted by "O−" in FIG. 3) and the second portion on the other side of divider device (e.g., 302A-302D) includes an oxygen enriched flow portion (denoted by "O+" in FIG. 3). In the embodiments shown in FIGS. 2B and 3, during operation of the present technology, separator tube 202A has O− portion 210A and O+ portion 212A, separator tube 202B has O− portion 210B and O+ portion 212B, separator tube 202C has O− portion 210C and O+ portion 212C, and separator tube 202D has O− portion 210D and O+ portion 212D. In some embodiments, flow divider devices 302 divide the interior portions of separator tubes 202 at lengthwise parts of their downstream ends in half. In other embodiments, the cross-sectional area of O− flow portion is greater than the cross-sectional area of O+ flow portion. In other embodiments, the cross-sectional area of O− flow portion is less than the cross-sectional area of O+ flow portion.

In some embodiments, portions of the lengths of separator tube(s) 202 including divider devices 302 need not have magnet(s) 204 positioned proximal thereto because further magnetic separation of oxygen from flow 113 is unnecessary given the dual partitioning. Thus, dispensing with positioning magnet(s) 204 proximal such portions of downstream tube 202 ends may provide materials cost savings in system 100. In some embodiments, upstream ends of divider devices 302 are sufficiently shaped to prevent or at least mitigate turbulence and associated effects in flow 113 due to its dual partitioning. In an example, the upstream ends of divider devices 302 have a knife edge shape.

In any event, flow divider devices 302 are inserted, and extend, into interior portions of separator tubes 202 from the downstream ends thereof by a length sufficient to establish the dually portioned flow path 113, while maintaining the flow 113 under the desired (e.g., predetermined) conditions toward the downstream, second 116 end of separator stage 104 and on to flow director stage 105, as described below.

Figure 4A:
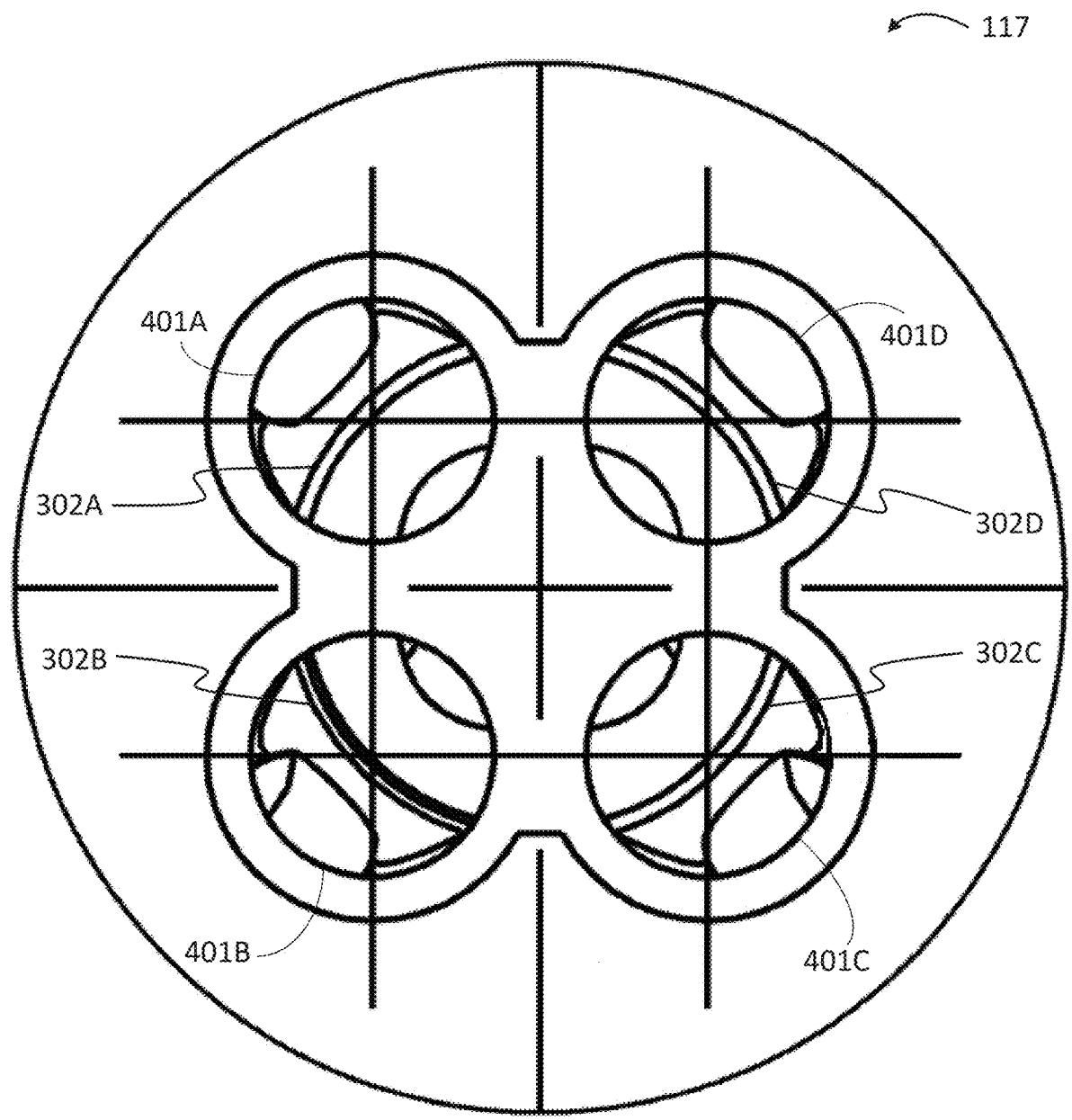
FIGS. 4A and 4B illustrate cross-sectional and perspective views of a flow director stage shown in FIG. 1, according to an embodiment.
Figure 4B:
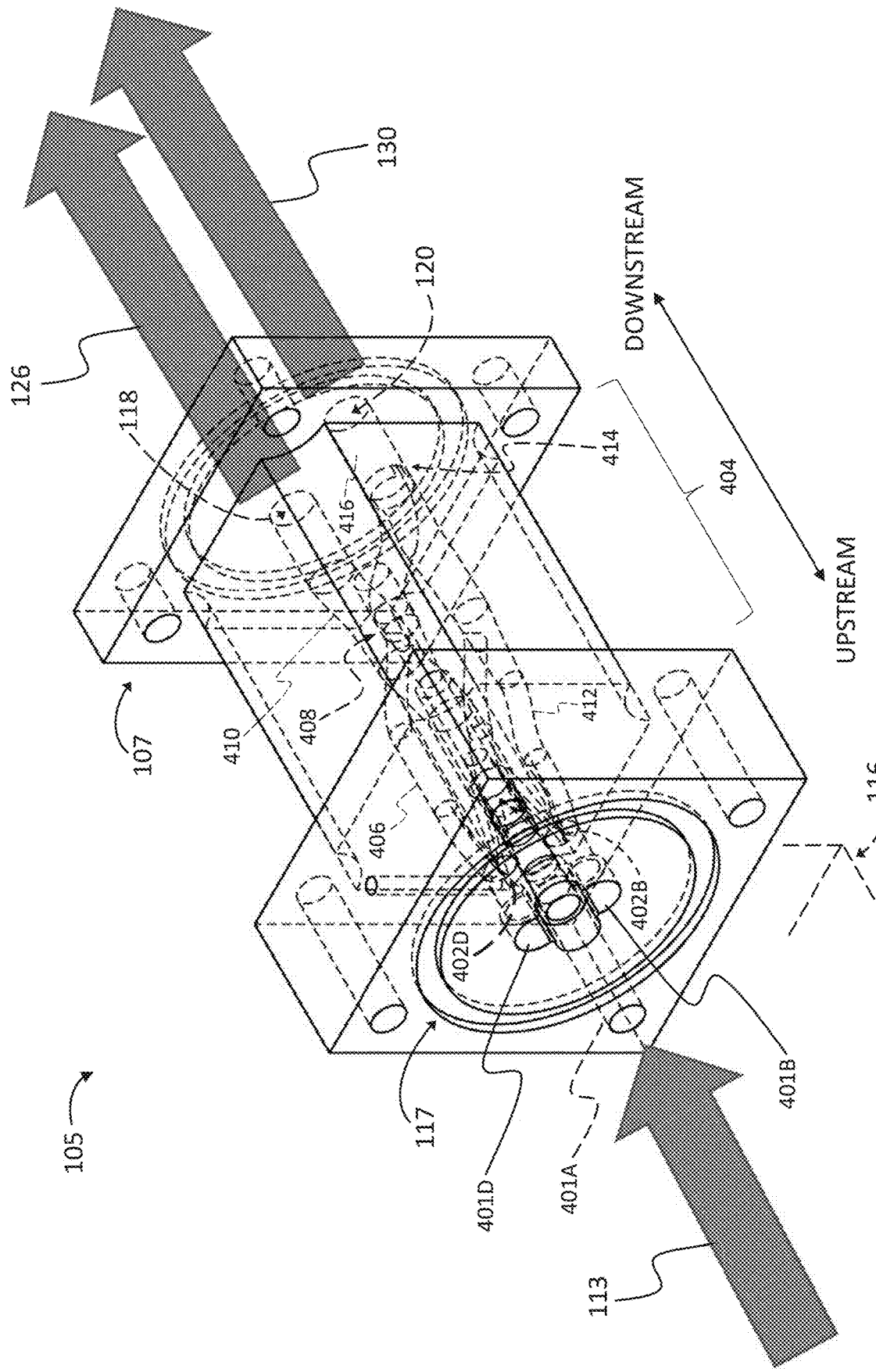

FIGS. 4A and 4B illustrate cross-sectional and perspective views of a flow director stage 105 shown in FIG. 1, according to an embodiment. Flow director stage 105 includes a flow divider 117 with one or more input ports 401. In the embodiment illustrated in FIGS. 4A and 4B, for example, flow divider 117 includes four input ports (401A-401D) for receiving corresponding flows of fluid 113 from downstream ends of respective separator tubes 202A-202D in flow communication with input ports 401A-401D. As shown in FIG. 4A, flow divider 117 includes four divider devices 302A-302D that for insertion into the downstream ends of corresponding separator tubes 202A-202D, as shown and described above with reference to FIG. 3.

Flow divider 117 includes inlet tubing or piping 402 having upstream ends in flow communication with input ports 401. In the embodiment shown in FIG. 4B, for example, upstream end of tubing or piping 402B is in flow communication with input port 401B, and upstream end of tubing or piping 402D is in flow communication with input port 401D. The dually partitioned flow 113 continues downstream from inlet tubing or piping 402 in flow divider 117 to a mid-section 404 of flow director stage 105. A first set of split tubing or piping 406 carries the oxygen enriched (O+) portions of dually partitioned flows 113 from each of the four separator tubes 202A-202D to be recombined at one or more flow recombination junctures 408 in mid-section 404. From junctures 408, oxygen enriched fluid flow 126 continues downstream in a first outlet tube or pipe 410 in flow communication with an upstream side of first outlet port 118. Flow 126 then exits second end 107 of flow division stage 105 at first outlet port 118. A second set of split tubing or piping 412 carries the oxygen depleted (O+) portions of dually partitioned flows 113 from each of the four separator tubes 202A-202D to be recombined at one or more flow recombination junctures 414 in mid-section 404. From junctures 414, oxygen depleted fluid flow 130 continues downstream in a second outlet tube or pipe 416 in flow communication with an upstream side of second outlet port 120. Flow 130 then exits second end 107 of flow division stage 105 at second outlet port 120.

Figure 5:
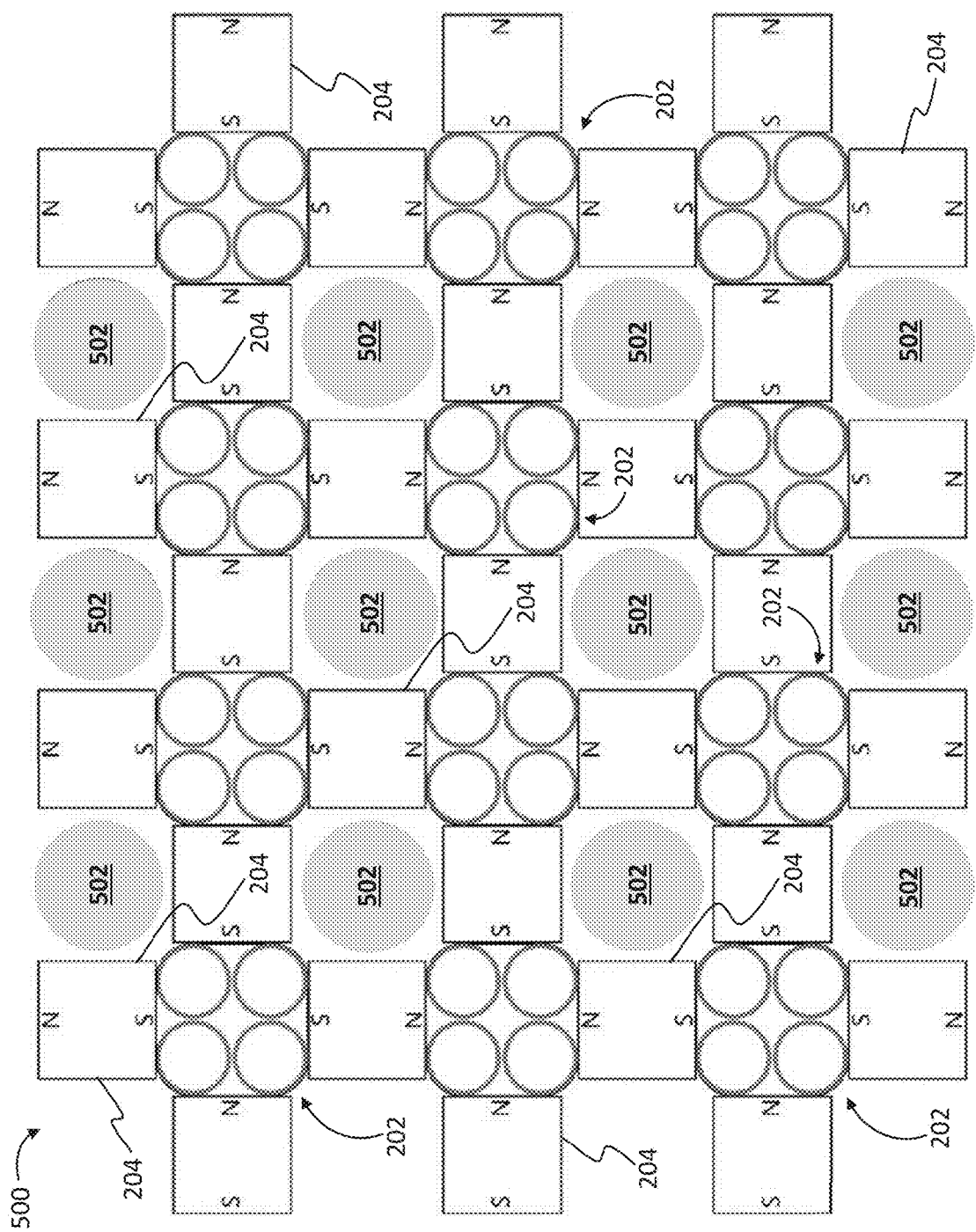
FIG. 5 illustrates a cross-sectional view of a separator stage according to another embodiment.

FIG. 5 illustrates a cross-sectional view of a separator stage 500 according to another embodiment. Separator stage 500 includes a plurality of sets of four separator tubes 202, with duplication of the magnets 204-tubes 202 arrangement as shown and described above with reference to FIGS. 2A and 2B. In some embodiments, separator stage 500 may be adapted for use with system 100, for example, by providing intake stage 102 having a flow splitter for splitting the received flow 113 stream of fluid into a number of flow streams 110 equal to the number of separator tubes 202 shown in FIG. 5 (e.g., 12 sets of four tubes 202). Similarly, in some embodiments, separator stage 500 may be adapted for use with system 100, for example, by providing flow division stage 105 having a flow divider 117 with a number of input ports 401 equal to the number of separator tubes 202 shown, for instance, in FIG. 5. Spaces 502 between magnets 204 may be utilized for cooling, as necessary to maintain continuous operation of separator stage 500.

Sharing of at least one magnet 204 between the at least two duplications of the magnet 204-separator tube 202 arrangements shown in FIG. 5 is advantageous for a variety of practical and technical reasons. For instance, providing two or more sets of separator tubes 202 for oxygen purification and separation using for example system 100 may increase throughput of associated processes. Furthermore, sharing of magnets 204 in separator stage 500 may provide materials costs savings since fewer magnets 204 are used be taking advantage of both the north and south poles (denoted "N" and "S" in FIG. 5) of at least one of the magnets 204.

Further efficiencies for oxygen separation and purification may be attained by minimizing the unused volumes of spaces 502 between magnets 204 in the separator stage 500 of FIG. 5.

Figure 6:
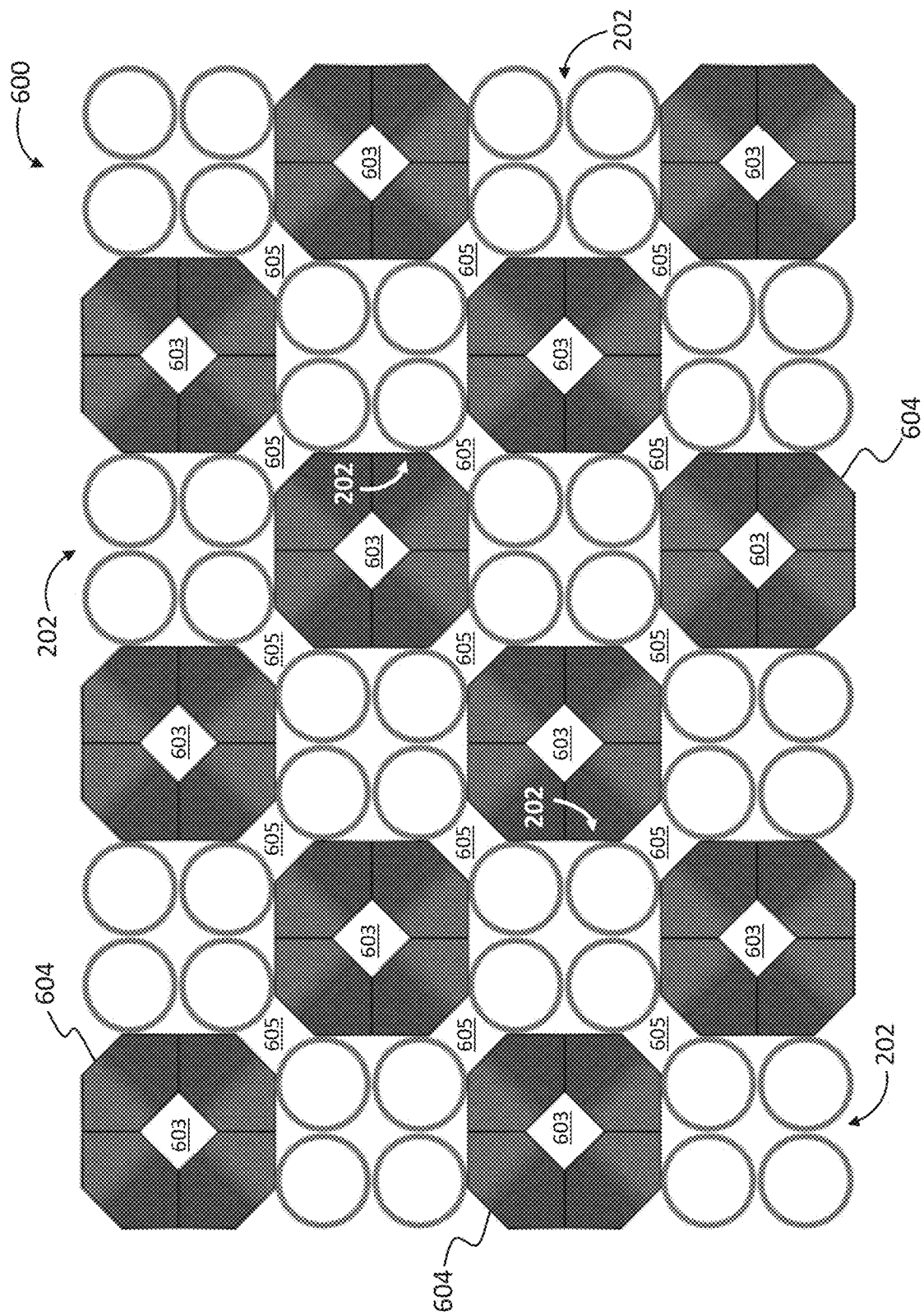
FIG. 6 illustrates a cross-sectional view of a separator stage according to yet another embodiment.

FIG. 6 illustrates a cross-sectional view of a separator stage 600 according to yet another embodiment. FIGS. 7A and 7B illustrate cross-sectional views of a magnet 604 as shown in FIG. 6, according to an embodiment. Separator stage 600 includes a plurality of sets of four separator tubes 202, with an arrangement of magnets 604 to minimize unused space and volume, and thereby maximize the efficiency of use thereof in separator stage 600 (e.g., as compared to separator stage 500).

In some embodiments, separator stage 600 may be adapted for use with system 100, for example, by providing intake stage 102 having a flow splitter for splitting the received flow 113 stream of fluid into a number of flow streams 110 equal to the number of separator tubes 202 shown in FIG. 6 (e.g., 12 sets of four tubes 202). Likewise, in some embodiments, separator stage 600 may be adapted for use with system 100, for example, by providing flow division stage 105 having a flow divider 117 with a number of input ports 401 equal to the number of separator tubes 202 of separator stage 600.

Referring to FIGS. 7A and 7B, each magnet 604 of separator stage 600 includes four substantially equivalently shaped (e.g., having dimensions varying by not more than +/−10%) magnet pieces 606A-606D. In some embodiments, magnet pieces 606 are elongate permanent magnets formed of any of the materials (e.g., neodymium) discussed above with reference to FIGS. 2A and 2B. Each magnet piece 606 of magnet 604 is a hexagon having two end vertex angles 608 of 90 degrees and remaining vertex angles 610 of 135 degrees. North and south ends (denoted "N" and "S" in FIGS. 6, 7A and 7B) are situated at respective piece 606 ends having right angles 608.

The shapes of magnet pieces 606 allow for stacking of four pieces 606A-606D into the arrangement shown in FIG. 7B to minimize cross-sectional area of space 603, while providing two north poles and two south poles for establishing magnetic field gradients (e.g., 206A-206D) in four separator tubes 202A-202D in like manner as shown and described above with reference to FIG. 2B. In this arrangement, magnets 604 are quadrupole magnets. In some embodiments, and for the same total number of sets of four separator tubes 202, a sum of cross-sectional areas of spaces 603 in longitudinally central portions, and spaces 605 defined by corners of tube 202 sets and magnets 604, is less than a sum of cross-sectional area of spaces 502 in separator stage 500, as shown in FIG. 5. In addition to providing similar technical and practical advantages as discussed above for separator stage 500, use of magnets 604 in separator stage 600 may provide savings in terms of weight as compared to separator stage 500. Central spaces 603 may be utilized for air, or liquid, based cooling, and/or other useful purposes, as necessary to maintain continuous operation of separator stage 600.

Figure 8:
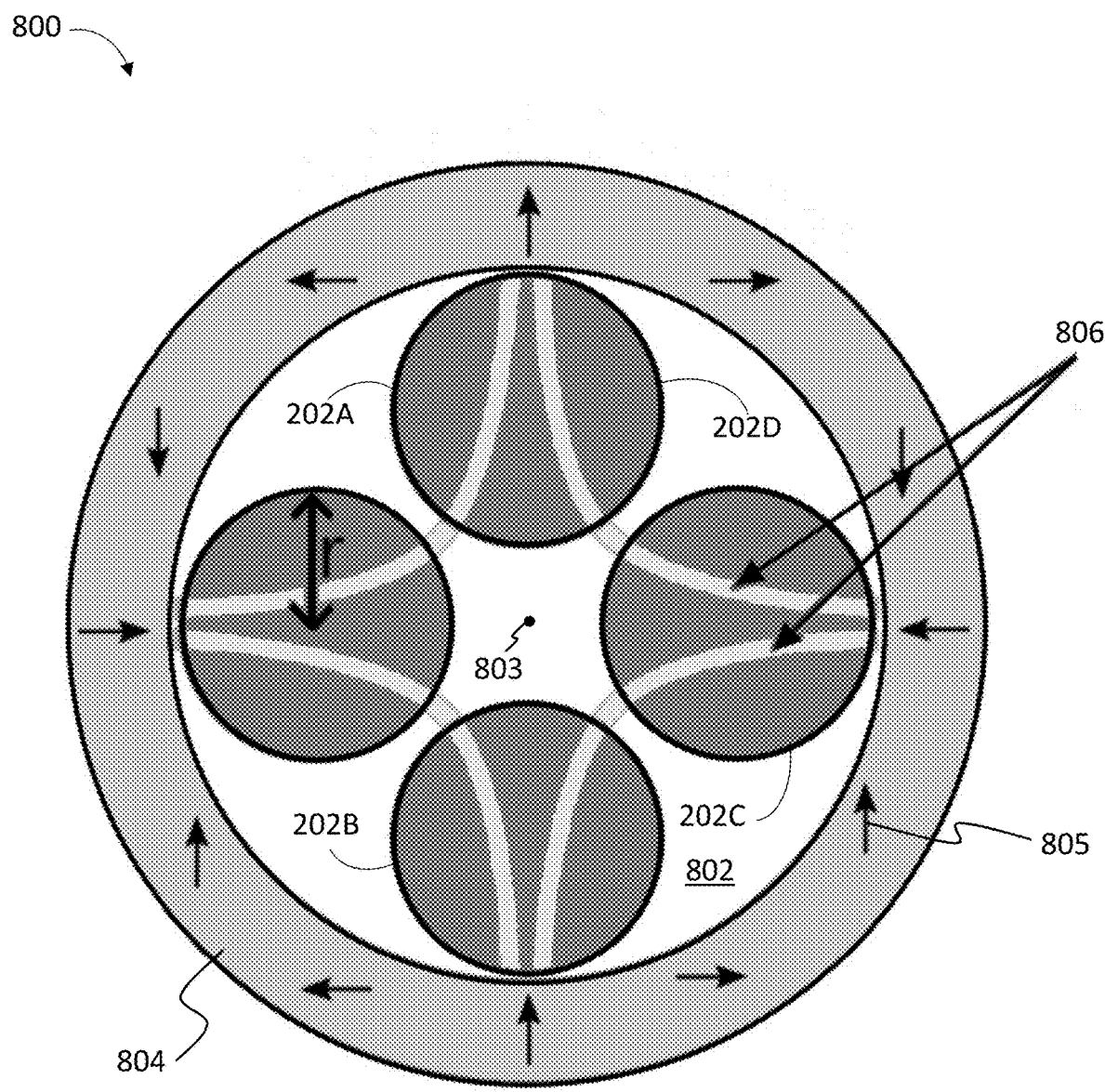
FIG. 8 illustrates a cross-sectional view of a separator stage that may be used in oxygen extraction systems according to some embodiments.

FIG. 8 illustrates a cross-sectional view of a portion of a separator stage 800 that may be used in oxygen extraction systems according to some embodiments. Separator stage 800 includes four separator tubes 202 positioned in an interior space 802 about a longitudinal center point 803 of at least one Halbach magnet 804. In the embodiment illustrated in FIG. 8, for example, Halbach magnet 804 is ring shaped and generates a uniform magnetic field in the directions indicated by the arrows 805 pointing from north poles to south poles. In some embodiments, Halbach magnet 804 is a permanent magnet formed of any of the materials (e.g., neodymium) discussed above with reference to FIGS. 2A and 2B.

In the separator stage 800 shown in FIG. 8, a magnetic field gradient 806 is established in each of the four separator tubes 202. Each magnetic field gradient 806 has its lowest magnitude in those interior portions of tubes 202 closest to center point 203 and has its greatest magnitude in those interior portions of separator tubes 202 that are furthest from center point 803, where the magnetic field generated by the Halbach magnet 804 is squeezed. In like manner as described above with reference to FIGS. 2A, 2B and 3, oxygen in flow 113 through separator tubes 202 of separator stage 800 in the interior portions having the greatest magnetic field gradient is enriched, while fluid flow 113 in interior portions having comparatively lower magnetic field gradient magnitude is depleted of oxygen.

As with separator stages 500 and 600, use of Halbach magnet(s) 804 in separator stage 800 provides enhanced space and volume efficiencies for system 100. In some embodiments, separator stage 800 may include a plurality of annular Halbach magnets 804, each having four separator tubes 202A-202D disposed in their respective interior spaces 802. In those embodiments, magnetic field shielding material may be disposed between adjacent Halbach magnets 804 to prevent, or at least mitigate, distortion of the magnetic field gradients 806 established in separator tubes 202 for purposes of separating and purifying oxygen according to the disclosed systems and methods.

Figure 9:
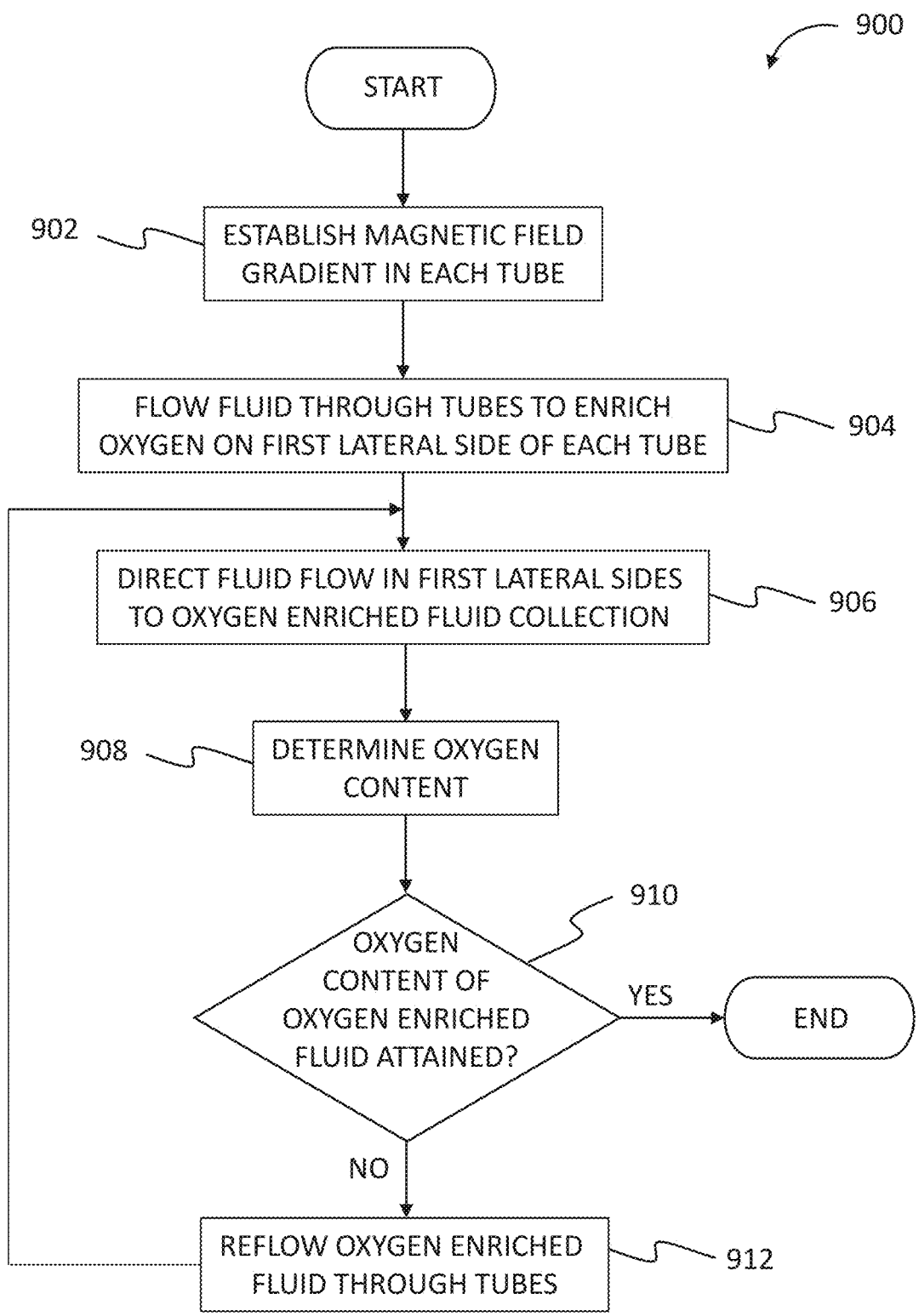
FIG. 9 is a flow chart of an oxygen separation method according to an embodiment.

FIG. 9 is a flow chart of an oxygen separation method 900 according to an embodiment. From a start state (e.g., fluid 113 not yet flowing into system 100), method 900 includes establishing 902 a magnetic field gradient (e.g., 206A) in at least one tube (e.g., separator tube 202A) having a first end in flow communication with a source of a fluid (e.g., 113) containing oxygen. In some embodiments, the at least one tube has a circular cross section and establishing 902 the magnetic field gradient includes establishing the magnetic field gradient radially across an interior portion of the tube.

The fluid may include either or both of liquid and gas phases containing either or both of liquid and gaseous oxygen (e.g., as $O_2$). Method 900 includes flowing 904 the fluid through the at least one tube. The magnetic field gradient established in the at least one tube causes oxygen to be enriched in the fluid on a first interior (e.g., lateral) side of the tube as compared to a second interior (e.g., lateral) side of the tube. Method 900 includes directing 906, at a second end of the at least one tube opposite the first end, at least a portion of the fluid flowing in the first interior side and having an enriched oxygen content as compared to the second interior side to a means for collecting an oxygen enriched fluid (e.g., a tank, cylinder, or the like).

In some embodiments, method 900 further includes determining 908 an oxygen content of the oxygen enriched. In an example, the determining 908 step uses the oxygen sensor 128 to determine the oxygen content of oxygen enriched fluid flow 126. Method 900 may further include determining 910 whether the oxygen content of the oxygen enriched fluid flow 126 has attained a desired (e.g., predetermined) oxygen content. Upon flow 126 attaining the desired oxygen content as determined 908 by, for example, use of sensor 128, method 900 may proceed to an end state (e.g., oxygen enriched fluid flow 126 is collected and flow 113 is ceased through system 100). As shown and described above in greater detail with reference to FIGS. 2A and 2B, in cases where flow 126 has not yet attained the desired oxygen content, method 900 may further include reflowing 912 the oxygen enriched fluid in flow 126 through the same, or a different instance of, tube(s) for a number of times (e.g., iterations) sufficient to attain the predetermined oxygen content in flow 126.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system for extracting oxygen from a fluid, comprising:
    four separator tubes arranged adjacent to one another to thereby form a central space between the four separator tubes, the four separator tubes defining four separate fluid flow paths;
    a flow divider positioned inside a longitudinal portion of each separator tube of the four separator tubes proximate to a downstream end of each separator tube of the four separator tubes, wherein the flow divider includes an upstream end and a downstream end, and extends from the upstream end to the downstream end and radially spans each separator tube of the four separator tubes from a first lateral side of each separator tube of the four separator tubes to a second lateral side of each separator tube of the four separator tubes to thereby fluidically isolate a first side of the fluid flow path of each separator tube of the four separator tubes from a second side of the fluid flow path of each separator tube of the four separator tubes downstream of the upstream end of the flow divider; and
    at least one magnet positioned around, and opposite the central space of, the four separator tubes proximate to the first side of the fluid flow path of each separator tube of the four separator tubes, the at least one magnet positioned upstream of the upstream end of the flow divider to establish a magnetic field asymmetrically inside and across the fluid flow path of each separator tube of the four separator tubes, wherein for each separator tube of the four separator tubes, a magnetic field gradient of the magnetic field has a magnitude that is greater on the first side of the fluid flow path as compared to the second side of the fluid flow path to concentrate oxygen as molecular $O_2$ on the first side of the fluid flow path.

2. The system of claim 1, wherein each separator tube of the four separator tubes has a circular cross-section over its entire length.

3. The system of claim 1, further comprising a sensor for determining an oxygen content of the fluid in at least one of: the first side, and the second side, of the fluid flow path.

4. The system of claim 1 further comprising tubing or piping for reflowing at least a portion of the fluid downstream of the flow divider through each separator tube of four separator tubes.

5. The system of claim 1 further comprising means for determining an oxygen content of the fluid in at least one of: the first side, and the second side, of the fluid flow path.

6. The system of claim 1 further comprising means for reflowing at least a portion of the fluid downstream of the flow divider through each separator tube of four separator tubes.

7. The system of claim 1, wherein a north pole of the at least one magnet is positioned perpendicularly with respect to a south pole of the at least one magnet.

8. The system of claim 1, wherein the upstream end of the flow divider includes a knife edge shape for preventing or at least mitigating turbulence in the fluid flow path.

9. The system of claim 1, wherein the at least one magnet includes at least one permanent magnet.

10. The system of claim 1, wherein the flow divider defines a plane extending from the upstream end to the downstream end.

11. The system of claim 1, wherein the magnetic field gradient of the magnetic field is further established radially across the fluid flow path of each separator tube of the four separator tubes.

12. A system for extracting oxygen from a fluid, comprising:
    a separator stage comprising:
        a separator tube having an interior portion defining a fluid flow path from a first end of the separator tube to a second end of the separator tube; and
        at least one magnet positioned proximate to the separator tube between the first end and the second end to establish a magnetic field in the interior portion, wherein:
            a magnitude of a magnetic field gradient of the magnetic field is greater on a first lateral side of the interior portion as compared to a second lateral side of the interior portion to thereby cause oxygen to be concentrated as molecular $O_2$ on the first lateral side as compared to the second lateral side; and
            the magnetic field gradient is established asymmetrically across the fluid flow path; and
    a flow director stage comprising:
        a flow divider positioned inside a portion of the separator tube downstream of the at least one magnet and proximate to the second end, wherein the flow divider includes an upstream end and a downstream end, and wherein the flow divider extends from the upstream end to the downstream end and radially spans the separator tube from the first lateral side to the second lateral side to divide the fluid flow path into:
            a first flow path for an $O_2$ enriched fluid flow from the first lateral side; and
            a second flow path for an $O_2$ depleted fluid flow from the second lateral side;
        a first exit tube in flow communication with the second end for carrying the first flow path downstream of the separator tube; and
        a second exit tube in flow communication with the second end for carrying the second flow path downstream of the separator tube.

13. The system of claim 12, wherein the separator tube has a circular cross-section over an entire length of the separator tube.

14. The system of claim 12, wherein the at least one magnet includes at least one permanent magnet.

15. The system of claim 12, wherein a north pole of the at least one magnet is positioned perpendicularly with respect to a south pole of the at least one magnet.

16. The system of claim 12, wherein the upstream end of the flow divider includes shaped means for preventing or at least mitigating turbulence in the fluid flow path.

17. The system of claim 16, wherein the shaped means of the upstream end of the flow divider has a knife edge shape.

18. An oxygen separation method, comprising:
  establishing, by at least one magnet, a magnetic field in each separator tube of four separator tubes arranged adjacent to one another to thereby form a central space between the four separator tubes, the four separator tubes defining four separate fluid flow paths, wherein the at least one magnet is positioned around, and opposite the central space of, the four separator tubes proximate to a first side of the fluid flow path of each separator tube of the four separator tubes, wherein a magnitude of a magnetic field gradient is greater on the first side of the fluid flow path as compared to a second side of the fluid flow path of each separator tube of the four separator tubes;
  flowing the fluid through each separator tube of the four separator tubes;
  concentrating, by the magnetic field gradient and during the flowing, molecular $O_2$ in the fluid proximate to the first side of the fluid flow path as compared to the second side of the fluid flow path; and
  dividing, during the flowing, and using a flow divider including an upstream end and a downstream end, and positioned inside a longitudinal portion of each separator tube of the four separator tubes downstream of the at least one magnet, the fluid flow path into:
    a first flow path for an $O_2$ enriched fluid flow from the first side of the fluid flow path; and
    a second flow path for an $O_2$ depleted fluid flow from the second side of the fluid flow path,
  wherein the flow divider extends from the upstream end to the downstream end and radially spans each separator tube of the four separator tubes from a first lateral side of each separator tube of the four separator tubes to a second lateral side of each separator tube of the four separator tubes to thereby fluidically isolate the first flow path from the second flow path downstream of the upstream end of the flow divider during the dividing, and
  wherein establishing the magnetic field comprises establishing the magnetic field asymmetrically inside and across an interior portion of the fluid flow path of each separator tube of the four separator tubes upstream of the upstream end of the flow divider.

19. The method of claim 18 further comprising directing, at least a portion of the fluid flowing in the first flow path to a means for collecting the $O_2$ enriched fluid flow.

20. The method of claim 18 further comprising determining an oxygen content of the fluid.

21. The method of claim 18 further comprising reflowing the $O_2$ enriched fluid through each separator tube of the four separator tubes for a number of times sufficient to attain a predetermined oxygen content in the $O_2$ enriched fluid flow.

22. The method of claim 18, wherein establishing the magnetic field further comprises establishing the magnetic field having the magnetic field gradient and extending from a north pole of the at least one magnet to a south pole of the at least one magnet positioned perpendicularly with respect to the north pole.

23. The method of claim 18 further comprising preventing or at least mitigating turbulence in the fluid flow path during the dividing.

24. The method of claim 18, wherein the upstream end of the flow divider has a knife edge shape, the method further comprising preventing or at least mitigating, by the knife edge shape of the upstream end of the flow divider, turbulence in the fluid flow path of each separator tube of the four separator tubes during the dividing.

* * * * *